United States Patent
Suzuki et al.

(10) Patent No.: US 7,203,819 B2
(45) Date of Patent: Apr. 10, 2007

(54) PROGRAM PROCESSING DEVICE

(75) Inventors: Takayuki Suzuki, Gifu (JP); Naoya Yamakawa, Gifu-ken (JP)

(73) Assignee: Sony Electric Co., Ltd, Osaka (JP)

( * ) Notice: Subject to any disclaimer, the term of this patent is extended or adjusted under 35 U.S.C. 154(b) by 217 days.

(21) Appl. No.: 10/919,126

(22) Filed: Aug. 16, 2004

(65) Prior Publication Data

US 2005/0044345 A1 Feb. 24, 2005

(30) Foreign Application Priority Data

Aug. 21, 2003 (JP) .............................. 2003-297457

(51) Int. Cl.
*G06F 11/28* (2006.01)

(52) U.S. Cl. ................................... 712/227

(58) Field of Classification Search ................ 712/227; 714/734; 717/124, 127, 129
See application file for complete search history.

(56) References Cited

U.S. PATENT DOCUMENTS

| | | | |
|---|---|---|---|
| 5,530,804 A * | 6/1996 | Edgington et al. | 714/30 |
| 5,943,498 A * | 8/1999 | Yano et al. | 717/128 |
| 6,158,023 A * | 12/2000 | Ubukata et al. | 714/35 |
| 6,256,777 B1 * | 7/2001 | Ackerman | 717/129 |
| 6,331,957 B1 * | 12/2001 | Kurts et al. | 365/201 |
| 6,643,803 B1 * | 11/2003 | Swoboda et al. | 714/38 |
| 6,668,339 B1 * | 12/2003 | Maeda | 714/38 |
| 6,687,857 B1 * | 2/2004 | Iwata et al. | 714/38 |
| 6,751,751 B1 * | 6/2004 | Murray et al. | 714/34 |
| 6,985,980 B1 * | 1/2006 | Allegrucci | 710/107 |
| 7,114,101 B2 * | 9/2006 | Kudo et al. | 714/30 |
| 2001/0010083 A1 * | 7/2001 | Satoh | 714/30 |
| 2002/0065646 A1 * | 5/2002 | Waldie et al. | 703/26 |
| 2002/0091494 A1 * | 7/2002 | Kudo | 702/119 |
| 2002/0144235 A1 | 10/2002 | Simmers et al. | 717/124 |
| 2002/0157085 A1 | 10/2002 | Yabuno et al. | 717/126 |

FOREIGN PATENT DOCUMENTS

| | | |
|---|---|---|
| JP | 08-185339 | 7/1996 |
| JP | 11-282712 | 10/1999 |
| JP | 2003-162426 | 6/2003 |

* cited by examiner

*Primary Examiner*—Eric Coleman
(74) *Attorney, Agent, or Firm*—Fish & Richardson P.C.

(57) ABSTRACT

A program processing device that improves efficiency when debugging software. The processing device includes a CPU core and a break circuit, which is connected to an internal bus that is used by the CPU core to access a memory area. The break circuit monitors the internal bus and checks whether a designated variable in the program has been rewritten. When the designated variable has been rewritten, the break circuit breaks the operation of the CPU core.

12 Claims, 2 Drawing Sheets

Fig. 2

| | ADRH | ADRM | ADRL | DATA |
|---|---|---|---|---|
| MON 0 | 03:0000h | 03:0001h | 03:0002h | 03:0003h |
| MON 1 | 03:0004h | 03:0005h | 03:0006h | 03:0007h |
| MON 2 | 03:0008h | 03:0009h | 03:000Ah | 03:000Bh |
| MON 3 | 03:000Ch | 03:000Dh | 03:000Eh | 03:000Fh |
| MON 4 | 03:0010h | 03:0011h | 03:0012h | 03:0013h |
| MON 5 | 03:0014h | 03:0015h | 03:0016h | 03:0017h |
| MON 6 | 03:0018h | 03:0019h | 03:001Ah | 03:001Bh |
| MON 7 | 03:001Ch | 03:001Dh | 03:001Eh | 03:001Fh |

Fig. 3

| | MON7 | MON6 | MON5 | MON4 | MON3 | MON2 | MON1 | MON0 |
|---|---|---|---|---|---|---|---|---|
| break any | 1 | 1 | 1 | 1 | 1 | 1 | 1 | 1 |
| break it | 0 | 1 | 1 | 1 | 0 | 1 | 0 | 0 |
| break out | 0 | 0 | 0 | 0 | 0 | 0 | 0 | 0 |

PROGRAM PROCESSING DEVICE

CROSS-REFERENCE TO RELATED APPLICATIONS

This application is based upon and claims priority from Japanese Patent Application No. 2003-297457 filed on Aug. 21, 2003, which is herein incorporated in its entirety by reference.

BACKGROUND OF THE INVENTION

The present invention relates to a program processing device, and more particularly, to a control LSI optimal for use when testing the operation of built-in software (firmware).

In recent years, an evaluation chip is normally used when developing software. The evaluation chip includes a CPU of a target system and an interface circuit, which supports software debugging. The evaluation chip, which is mounted on a user board, is connected to an in-circuit emulator (ICE (a registered trademark)). The ICE provides a debug command to the CPU to perform software debugging. Japanese Laid-Open Patent Publication No. 11-282712 describes an example of a debug system that uses an evaluation chip.

In a semiconductor package device, such as a system on a chip (SOC) that lays out a plurality of peripheral circuits including a CPU to realize system level functioning, the bus for the CPU and control signals are concentrated in the chip. This structure decreases the debugging efficiency. More specifically, when developing software for the SOC, CPUs must separately be connected to an evaluation board to undergo debugging. Thereafter, the CPUs and a plurality of peripheral circuits are ultimately integrated in a single chip. This increases the developing cost, prolongs the designing time, and lengthens the turn around time (TAT).

Generally, the number of terminal pins that are used for debugging in an SOC is small to minimize the cost for conducting testing, such as software debugging. Thus, debugging cannot be performed efficiently.

When developing software in a prior art, a breakpoint is set in the source code for a program. The execution of the program is interrupted when reaching the breakpoint to perform debugging. However, the program memory must be rewritten to set the breakpoint. This makes debugging complicated.

SUMMARY OF THE INVENTION

One aspect of the present invention is a program processing device for accessing a memory area and processing a program including at least one variable. The program processing device includes a semiconductor substrate. A processor, arranged on the semiconductor substrate, executes the program. An internal bus is arranged on the semiconductor substrate and connected to the processor. The processor accesses the memory area via the internal bus to execute the program. A break circuit, which is connected to the internal bus, monitors the at least one variable. The break circuit breaks the operation of the processor in accordance with the value of the at least one variable.

Another aspect of the present invention is a program processing device for processing a program including at least one variable. The program processing device includes a semiconductor substrate. A processor arranged on the semiconductor substrate executes the program. An internal bus is arranged on the semiconductor substrate and connected to the processor. The processor accesses a memory area via the internal bus to execute the program. A break circuit, which is connected to the internal bus, monitors the at least one variable. The break circuit is operated in a break mode for breaking the operation of the processor when the processor rewrites the value of the at least one variable.

A further aspect of the present invention is a program processing device for processing a program including at least one variable. The program processing device includes a semiconductor substrate. A processor arranged on the semiconductor substrate executes the program. An internal bus is arranged on the semiconductor substrate and connected to the processor. The processor accesses a memory area via the internal bus to execute the program. A break circuit, which is connected to the internal bus, monitors the at least one variable in the program. The break circuit is operated in a break mode for breaking the operation of the processor when the value of the at least one variable is rewritten to a designated value.

A further aspect of the present invention is a debug system for debugging a program including a variable designated by a programmer. The debug system includes a debugging device and a program processing device communicated with the debugging device for processing the program. The program processing device includes a semiconductor substrate, a processor, arranged on the semiconductor substrate, for accessing a memory area to execute the program, an internal bus arranged on the semiconductor substrate and connected to the processor, and a break circuit for monitoring the internal bus and checking whether the variable has been rewritten. The break circuit breaks the operation of the processor when the variable is rewritten to a value other than an initial value or to a designated value.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 2 is a diagram showing an example of an internal register in a break circuit; and FIG. 3 is a diagram showing an example of a mode setting register in a break circuit.

DETAILED DESCRIPTION OF THE PREFERRED EMBODIMENT

Figure 1:
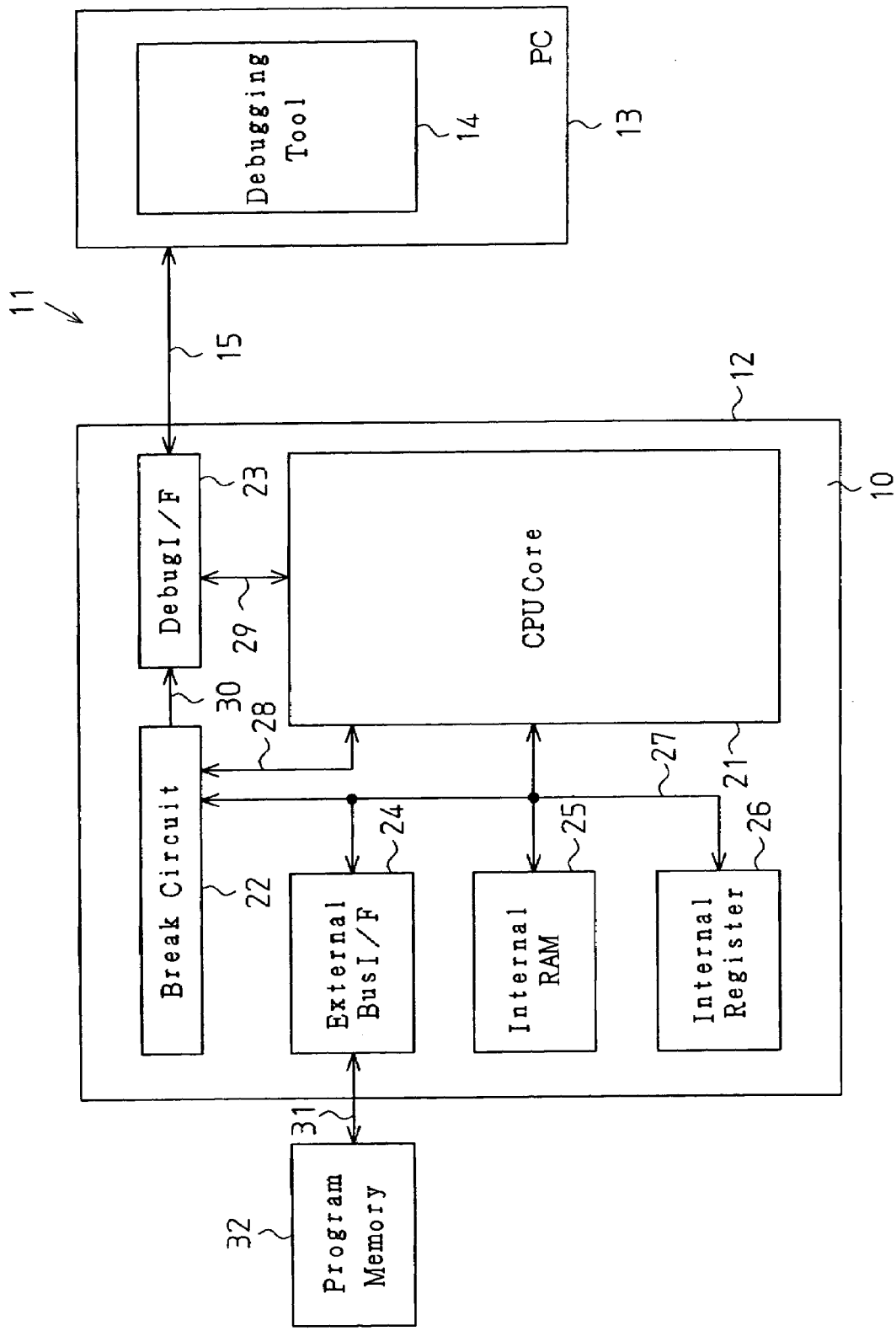
FIG. 1 is a schematic block diagram of a debug system according to a preferred embodiment of the present invention.

A program processing device according to a preferred embodiment of the present invention will now be discussed. The program processing device is applied to a control LSI for debugging firmware.

Referring to FIG. 1, in the preferred embodiment, a debug system 11 includes a control LSI 12, which functions as a program processing device, and a personal computer (PC) 13, which is connected to the control LSI 12 and functions as a debugging device. The LSI 12 is a system LSI configured by mounting a CPU and a plurality of peripheral circuits on a single chip. Further, the LSI 12 realizes the system level functions. The PC 13 includes a debugging tool, such as an ICE.

The control LSI 12 includes a debug terminal (not shown). A bus cable 15 of a tool bus is connected to the debug terminal. The control LSI 12 performs serial communication with the debugging tool 14 via the bus cable 15. It is preferred that the number of pins for the debug terminal be small to keep the control LSI 12 compact. In the preferred embodiment, there are two debug terminal pins, which are connected to a clock bus and a data bus. Data transfer (bidirectional) is performed between the control LSI 12 and the debugging tool 14 in synchronism with a clock signal.

The control LSI 12 includes a semiconductor substrate 10. A CPU core 21, a break circuit 22, a debug interface (I/F) 23, an external bus interface (I/F) 24, an internal RAM 25, and an internal register 26 are mounted on the semiconductor substrate 10. The internal RAM 25 and the internal register 26 function as peripheral circuits. The control LSI 12 includes a signal processing circuit (not shown) controlled by the CPU core 21.

The CPU core 21, the break circuit 22, the external bus I/F 24, the internal RAM 25, and the internal register 26 are connected to one another by an internal bus 27. The CPU core 21 and the break circuit 22 are connected to each other by an internal bus 28. The CPU core 21 and the debug I/F are connected to each other by an internal bus 29. The break circuit 22 and the debug I/F 23 are connected to each other by an internal bus 30.

The external bus I/F 24 is connected to a program memory 32 by an external bus 31. The program memory 32 is, for example, a flash memory. Firmware, which is the subject of debugging, is stored in the CPU core 21 so that it can be executed by the CPU core 21. The program memory 32 may store command lines in machine language that can be executed by the CPU core 21. A compile process or a link process is performed on the firmware (program), which is written in high-level language such as C-language, to convert the firmware to the machine language command lines.

The CPU core 21 reads the command lines from the program memory 32 and decodes the command lines. The CPU core 21 accesses a section (memory area) designated by an address mapped on a memory map of the CPU core 21 to execute various processes in accordance with the decoding result. The memory area includes the internal RAM 25 and the internal register 26, which are connected to the CPU core 21 by the internal bus 27, and the memory area peripheral circuits (not shown) connected to the control LSI 12 by the external bus 31. The internal bus 27 is used when the CPU core 21 accesses the memory area.

When the CPU core 21 executes a program, the break circuit 22 monitors an internal bus 27 to monitor the state of one or more variables set in the source code for the program. The break circuit 22 will now be described with reference to FIG. 2. The break circuit 22 includes an internal register 41. Address values of variables to be monitored by the break circuit 22 are registered in the internal register 41. When the CPU core 21 executes a program, the break circuit 22 monitors the internal bus 27 (specifically, address bus) and checks whether an address registered in the internal register 41 has been transmitted through the internal bus 27. Thus, the break circuit 22 recognizes whether the CPU core 21 is accessing the variable, which is associated with the address. When the variable is rewritten by the CPU core 21, the break circuit 22 retrieves the updated data from the internal bus 27 (specifically, data bus) and stores the updated data in the internal register 41. In this manner, during the execution of the program, the break circuit 22 monitors variables of the program that are designated beforehand to check whether the variables have been rewritten.

The break circuit 22 is provided with a variable break function that interrupts (breaks) the operation of the CPU core 21 with a trap command in accordance with the state of the monitored variable.

The variable break function includes a first break mode (first mode) and a second break mode (second mode). In the first mode, the break circuit 22 breaks the operation of the CPU core 21 when the monitored variable is rewritten to an arbitrary value, such as a value excluding the initial value, and then stores the value of the monitored variable in the internal register 41. That is, in the first mode, the break circuit 22 breaks the operation of the CPU core 21 whenever a monitored variable is rewritten. In the second mode, the break circuit 22 breaks the operation of the CPU core 21 when the monitored variable is rewritten to a value that is designated beforehand (designated value). The break circuit 22 breaks the operation of the CPU core 21 in accordance with the first or second mode. The first or second mode is set by a mode setting register 51, which is shown in FIG. 3.

The internal register 41 and the mode setting register 51 will now be discussed with reference to FIGS. 2 and 3.

As shown in FIG. 2, the internal register 41 includes an address register 42 and a data register 43, which hold, for example, eight types of variable information. "Variable information" refers to the address values of the monitored variables, the values of the variables monitored in accordance with the address values, and the variable values that are designated (designated values) when the second mode of the variable break function is set.

The break circuit 22 monitors the state of the eight variables. Each piece of variable information is held in the address register 42 and the data register 43 in relation with monitor data MON0 to MON7.

The address register 42 includes a first register ADRH, a second register ADRM, and a third register ADRL, each of which stores eight bits of data, to store the address value of a variable monitored in a program (total twenty-four bits).

Based on the address values (each twenty-four bits) registered in the address register 42, the data register 43 stores the eight bits of a monitored variable value (designated value) or the eight bits of a variable value designated when setting the second mode (designated value) as DATA.

The mode setting register 51 of FIG. 3 is used to set the variable break function for each piece of the monitor data MON0 to MON7. The mode setting register 51 includes a first setting register 52 (break any), a second setting register 53 (break it), and a break occurrence check register 54 (break out).

The first and second setting register 52 and 53 store bits corresponding to the monitor data MON0 to MON7. The variable break function for each piece of monitor data MON0 to MON7 is determined in accordance with the value of the bits corresponding to the first and second setting registers 52 and 53. For example, when the bit value of the first setting register 52 is "1" and the bit value of the second setting register 53 is "0", the first mode is set for that piece of monitor data. When the bit values of the first and second setting registers 52 and 53 are both set to "1", the second mode is set for that piece of monitor data. In the example of FIG. 3, the first mode is set for the monitor data MON0, MON1, MON3, and MON7, and the second mode is set for the monitor data MON2, MON4, MON5, and MON6.

When the break circuit 22 breaks an operation (interrupts the operation of the CPU core 21), the bit value of the break occurrence check register 54 corresponding to each-piece of the monitor data MON0 to MON7 is set to "1".

For each piece of the monitor data MON0, MON1, MON3, and MON7 set in the first mode, when the monitored variable is rewritten (the rewritten value is an arbitrary value), the break circuit 22 stores the updated data in the data register 43 and breaks the operation of the CPU core 21. When doing so, the break circuit 22 sets the bit value corresponding to the break occurrence check register 54 to "1".

For example, the break circuit 22 monitors the variable of the monitor data MON0 designated by "03:0000h", "03:0001h", "03:0002h" of the first, second, and third registers ADRH, ADRM, and ADRL shown in FIG. 2. When the variable is rewritten, the break circuit 22 stores the updated variable value in "03:0003h" of the data register 43 and breaks the operation of the CPU core 21. The break circuit 22 also sets "1" as the bit value of the break occurrence check register 54 corresponding to the monitor data MON0. The bit value "1" is set (cleared) to bit value "0" after checking the operation state of the program.

With regard to the monitor data MON2, MON4, MON5, and MON6 set in the second mode, the break circuit 22 breaks the operation of the CPU core 21 when the monitored variable is rewritten to a designated value registered in the data register 43. When doing so, the break circuit 22 sets the bit value corresponding to the break occurrence check register 54 to "1".

For example, the break circuit 22 monitors the variable of the monitor data MON2 designated by "03:0008h", "03:0009h", "03:000Ah" of the first, second, and third registers ADRH, ADRM, and ADRL shown in FIG. 2. When the variable is rewritten to a designated value registered beforehand in "03:000Bh" of the data register 43, the break circuit 22 breaks the operation of the CPU core 21 and sets "1" as the bit value of the break occurrence check register 54 corresponding to the monitor data MON2. The bit value "1" is set (cleared) to bit value "0" after checking the operation state of the program.

Following a predetermined transmission command, the variable information stored in the internal register 41 (address register 42 and data register 43) is periodically transmitted from the break circuit 22 to the debugging tool 14 (PC 13) via the debug I/F. In the preferred embodiment, serial data is transmitted by the bus cable 15, which is applicable for two pins.

For example, as variable information following the transmission command "C0h" and "04h" (not shown), the break circuit 22 transmits the address value of the variable stored in the first, second, and third registers ADRH, ADRM, and ADRL corresponding to the monitor data MON0, that is, "03:000h", "03:0001h", and "03:0002h". Based on the address value, the break circuit 22 transmits the data stored in "03:0003h" as the monitored variable based on the address value. The break circuit 22 transmits variable information to the debugging tool in the order of monitor data MON0, MON1, . . . , MON7, and MON0.

The debugging tool 14 sets the variable information in the internal register 41 and the modes in the mode setting register 51 (mode setting information).

The debugging tool 14 transmits the variable information and the mode setting information to the control LSI 12 in accordance with an instruction input to an input device (not shown) of the PC 13 by a developer (user). The CPU core 21 receives the transferred variable information and the mode setting information from the debug I/F 23 via the internal bus 29. Then, the CPU core 21 sets the received information in the internal register 41 and the mode setting register 51 through the internal bus 28.

The debugging tool 14 has the CPU core 21 execute the program (firmware). During the execution of the program, the break circuit 22 constantly monitors whether data (variable value) corresponding to a predetermined address value has been rewritten. When the data is rewritten, the break circuit 22 stores the updated variable value in the internal register 41.

In this state, with regard to a variable for which the variable break function is set, the operation of the CPU core 21 is broken in accordance with the set mode as described above. This enables the user to check the operation state of the program and correct bugs in the firmware.

Further, the break circuit 22 transmits the variable information stored in the internal register 41 from the debug I/F 23 to the debugging tool 14 (PC 13) via the internal bus 30 together with the predetermined transmission command. The debugging tool 14 sequentially retrieves the variable information transmitted from the control LSI 12 and then outputs the contents of the information to a display (not shown) of the PC 13. Accordingly, the user may check the operation state of the program from the variable information.

The preferred embodiment has the advantages described below.

(1) The control LSI 12 includes the break circuit 22, which monitors the internal bus 27 when the CPU core 21 accesses the memory area and monitors the state of designated variables. The break circuit 22 breaks the operation of the CPU core 21 when a monitored variable is rewritten to an arbitrary value. Thus, the variable designated in the program (e.g., variable located at a location where branching occurs) by a user may be checked to perform debugging. When the value of the monitored variable is changed, the operation of the CPU core 21 may be broken to correct a bug in the program. Debugging may be performed while monitoring the operation state of the program. This improves the debugging efficiency.

(2) The operation of the CPU core 21 may be broken only when the monitored variable is rewritten to a designated value. This shortens the time during which the operation of the CPU core 21 is stopped and improves the debugging efficiency.

(3) Debugging may be performed on variables designated beforehand based on variable information sequentially transmitted in a serial manner from the break circuit 22. Thus, debugging may be performed while monitoring the state of variables (program operation state) in real time without stopping the operation of the CPU core 21.

(4) Debugging is performed on a plurality of variables that are designated beforehand based on the variable information sequentially transmitted in a serial manner from the break circuit 22. Further, debugging is performed using the cable 15 that includes two buses, the clock bus and the data bus. Since the number of debug terminals is reduced, the control LSI 12 does not have to be enlarged.

(5) A breakpoint used for debugging does not have to be provided in the program source code as in the prior art. Thus, the program memory does not have to be rewritten to set the breakpoint.

(6) When developing software for a microcomputer or the like, software debugging may be performed in a state in which the CPU (CPU core 21) is connected to the microcomputer. This improves the software development efficiency and reduces the development cost. As a result, designing time is reduced and the TAT is shortened.

It should be apparent to those skilled in the art that the present invention may be embodied in many other specific forms without departing from the spirit or scope of the invention. Particularly, it should be understood that the present invention may be embodied in the following forms.

The control LSI 12 (system LSI) includes the internal RAM 25 and the internal register 26 (FIG. 1). However, the peripheral circuits mounted on the chip in addition to the CPU core 21 are not limited to the internal RAM 25 and the internal register 26.

The configurations of the break circuit 22 and the internal register 41 does not have to be as shown in FIG. 2. The number of pieces of variable information held as monitor data is not limited to eight as in the preferred embodiment as long as at least one piece of information is held.

The mode setting register 51 of the break circuit 22 is not limited to the configuration shown in FIG. 3. Further, the variable break function may include only one of the first mode and the second mode.

The variable break function may be set for every variable monitored by the break circuit 22.

The present invention may be applied when debugging anything other than firmware.

The present examples and embodiments are to be considered as illustrative and not restrictive, and the invention is not to be limited to the details given herein, but may be modified within the scope and equivalence of the appended claims.

What is claimed is:

1. A program processing device for use with a debugging device and for processing a program including at least one variable, the program processing device comprising: a semiconductor substrate having two debug terminal pins arranged thereon; a processor, arranged on the semiconductor substrate, for executing the program; an internal bus arranged on the semiconductor substrate and connected to the processor, the processor accessing a memory area via the internal bus to execute the program; and a break circuit, connected to the internal bus and to the debugging device via the two debug terminal pins, for monitoring the at least one variable and for breaking the operation of the processor in accordance with the value of the at least one variable.

2. The program processing device according to claim 1, wherein the break circuit includes: an address register for holding an address value associated with the at least one variable; and data register for holding the value of the at least one variable in accordance with the address value of the at least one variable.

3. A program processing device for use with a debugging device and for processing a program including at least one variable, the program processing device comprising: a semiconductor substrate having two debug terminal pins arranged thereon; a processor, arranged on the semiconductor substrate, for executing the program; an internal bus arranged on the semiconductor substrate and connected to the processor, the processor accessing a memory area via the internal bus to execute the program; and a break circuit, connected to the internal bus and to the debugging device via the two debug terminal pins, for monitoring the at least one variable, the break circuit being operated in a break mode for breaking the operation of the processor when the processor rewrites the value of the at least one variable.

4. The program processing device according to claim 3, wherein the break circuit includes: an address register for holding an address value associated with the at least one variable; and a data register for holding the value of the at least one variable based on the address value of the at least one variable.

5. The program processing device according to claim 3, wherein the at least one variable is a plurality of variables, and the break circuit includes a mode setting register that sets the break mode for each of the plurality of variables.

6. A program processing device for use with a debugging device and for processing a program including at least one variable, the program processing device comprising: a semiconductor substrate having two debug terminal pins arranged thereon; a processor, arranged on the semiconductor substrate, for executing the program; an internal bus arranged on the semiconductor substrate and connected to the processor, the processor accessing a memory area via the internal bus to execute the program; and a break circuit, connected to the internal bus and to the debugging device via the two debug terminal pins, for monitoring the at least one variable in the program, the break circuit being operated in a break mode for breaking the operation of the processor when the value of the at least one variable is rewritten to a designated value.

7. The program processing device according to claim 6, wherein the break circuit includes: an address register for holding an address value associated with the at least one variable; and a data register for holding the value of the at least one variable in accordance with the address value of the at least one variable.

8. The program processing device according to claim 7, wherein the at least one variable is a plurality of variables, and the break circuit includes a mode setting register that sets the break mode for each of the plurality of variables.

9. The program processing device according to claim 6, wherein the break circuit transmits to the debugging device via the two debug terminal pins variable information following a predetermined transmission command, the variable information including the address value, the variable associated with the address value, and the value of the variable designated in the break mode.

10. The program processing device according to claim 9, wherein the break circuit periodically transmits the variable information to the debugging device.

11. The program processing device according to claim 10, wherein the break circuit transmits the variable information in a serial manner to the debugging device.

12. A debug system for debugging a program including a variable designated by a programmer, comprising: a debugging device; a program processing device communicated with the debugging device for processing the program, the program processing device including: a semiconductor substrate having two debug terminal pins arranged thereon; a processor, arranged on the semiconductor substrate, for accessing a memory area to execute the program; an internal bus arranged on the semiconductor substrate and connected to the processor; and a break circuit, connected to the debugging device via the two debug terminal pins, for monitoring the internal bus and checking whether the variable has been rewritten, the break circuit breaking the operation of the processor when the variable is rewritten to a value other than an initial value or to a designated value.

* * * * *

UNITED STATES PATENT AND TRADEMARK OFFICE
CERTIFICATE OF CORRECTION

| | | |
|---|---|---|
| PATENT NO. | : 7,203,819 B2 | Page 1 of 1 |
| APPLICATION NO. | : 10/919126 | |
| DATED | : April 10, 2007 | |
| INVENTOR(S) | : Takayuki Suzuki and Naoya Yamakawa | |

It is certified that error appears in the above-identified patent and that said Letters Patent is hereby corrected as shown below:

On the Title Page, Item (73)
The Assignee is incorrectly listed. The Correct Assignee is as follows:

--Sanyo Electric Co., Ltd., Osaka, (JP)--

Signed and Sealed this

Twenty-second Day of May, 2007

JON W. DUDAS
*Director of the United States Patent and Trademark Office*